UNITED STATES PATENT OFFICE 2,228,398

CONDENSATION PRODUCTS AND PROCESS OF MAKING THE SAME

Emil Eduard Misslin and Rudolf Thomann, Basel, Switzerland, assignors to the firm of Society of Chemical Industry in Basle, Basel, Switzerland No Drawing. Application February 9, 1938, Serial No. 189,690. In Switzerland February 10, 1937

6 Claims. (Cl. 260—304)

In application Serial No. 189,689 there has been described a manufacture of valuable intermediate products and dyestuffs derived therefrom, wherein 1 mol of a nitrated benzoyl chloride is caused to react with a compound of the general formula

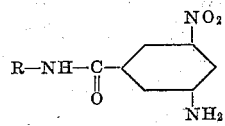

and the condensation product thus obtained is treated with a reducing agent. The new products thus obtained may be supposed to have the general formula

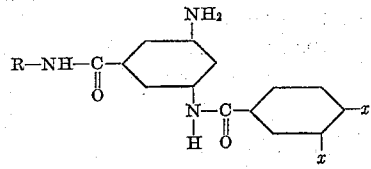

in which one $x$ is a hydrogen atom and the other $x$ an amino-group.

By the present invention such products are obtained by first causing 1 mol of para- or meta-nitrobenzoyl chloride to react with 3-amino-5-nitro-benzoic acid to produce a condensation product which may be supposed to have the formula

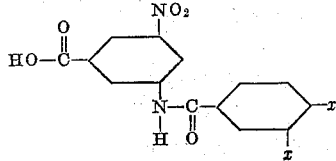

in which one $x$ is a hydrogen atom and the other $x$ is a nitro-group, and then treating this condensation product with a chlorinating agent by which the OH-group of the carboxylic acid is exchanged for a chlorine atom, for instance with phosphorus pentachloride or thionyl chloride. There is thus obtained a product the investigation of which shows that it corresponds with the general formula

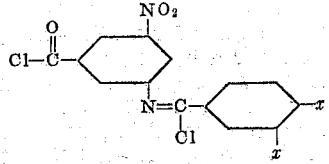

in which both $x$'s have the aforesaid significance. These new products have the surprising property that when they are condensed with compounds having reactive amino-groups, for instance aniline, aminophenols, anilinesulfonic acids and their homologues and analogues, aminonaphthols or the like, react solely in the sense that only the acid chloride group enters into reaction while the imide chloride group is reconverted under the conditions of the reaction into an ordinary acidyl group. By reducing the condensation product thus obtained there are produced products which can be used in the process of the aforesaid specification as intermediate products for the dyestuffs therein described.

The following examples illustrate the invention, the parts being by weight:

Example 1

In a closed spherical flask standing in the boiling water bath and provided with a stirrer, a charging funnel and a reflux condenser, there are caused to react 125 parts of phosphorus pentachloride with 99 parts of sharply dried 3-(4'- nitro) - benzoylamino - 5 - nitrobenzoic acid made by condensing 1 mol para-nitrobenzoyl chloride with 1 mol of 3-amino-5-nitrobenzoic acid by a known method. For completing the reaction the liquefied mass is stirred for one hour in the boiling water bath. From the clear brown solution the phosphorus hydroxy-chloride is carefully distilled by gradual heating in the oil bath to about 105° C. internal temperature under a vacuum of about 80 mm. of mercury. The contents of the flask solidify on cooling to a light grey mass which may be used directly for the condensation.

By recrystallization of the crude product from benzine of boiling point 102–126° C. there is obtained a yellowish white crystalline mass of 3-(4' - nitro) benzimide - chloride - 5 - nitrobenzoyl chloride of melting point 129–130° C. (uncorrected) and of the probable formula

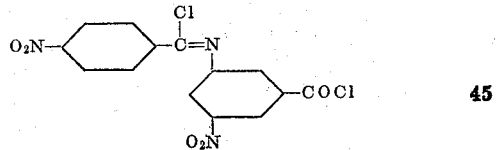

This compound is referred to hereinafter by the abbreviated expression "para-nitroimide chloride."

A similar product is obtained when meta-nitrobenzoyl chloride is used instead of para-nitrobenzoyl chloride. Instead of phosphorus pentachloride, thionyl chloride may for example be used.

Example 2

In a closed spherical flask of 5000 cc. capacity provided with a stirrer, a charging funnel, a dropping funnel, a thermometer and a reflux condenser, there are dissolved 51.9 parts of sulfanilic acid in 3000 parts of water and 16 parts of sodium carbonate to produce a neutral solution, and there are added 20 parts of crystallized sodium acetate (molecular weight 136) and 35 parts of powdered chalk, and the whole is stirred at 95–98° C. The para-nitroimide-chloride prepared from 99 parts of 3-(4'-nitro)benzoylamino-5-nitrobenzoic acid as described in Example 1 is dissolved in 600 cc. of hot chlorobenzene and the solution is dropped into that contained in the flask in the course of 2 hours. The mixture is further stirred for 15 minutes until all the chlorobenzene is distilled, whereupon the mass is allowed to cool and filtered with suction. The solid matter is suspended in water and is reduced by allowing the suspension to flow into a boiling suspension of 250 parts of iron powder in 3000 parts of water and 50 parts of hydrochloric acid of 30 per cent strength. After stirring for an hour at the boiling temperature the mixture is made alkaline with sodium carbonate and filtered, and the product of the reduction is precipitated by acidifying the filtrate and then isolated. When dry it is a light grey powder probably of the formula

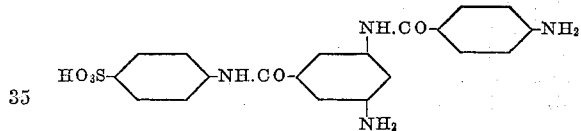

By condensing 2-aminonaphthalene-6-sulfonic acid with para-nitroimido chloride or the isomeric meta-nitro-compound and reducing the condensation product there are obtained products of the probable formulas

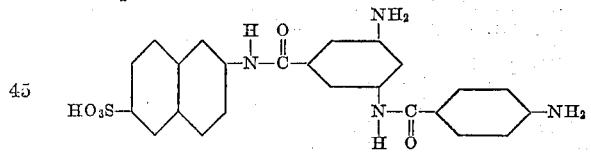

or

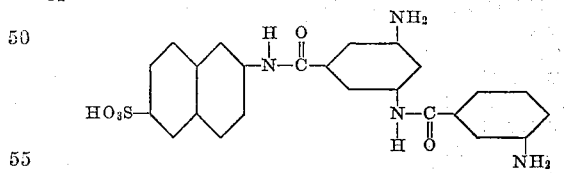

Example 3

By substituting 55.5 parts of 4:4'-diaminostilbene-2:2'-disulfonic acid for the 51.9 parts of sulfanilic acid prescribed in the first paragraph of Example 2 and conducting condensation and reduction exactly as described in that example, there is obtained a grey-yellow substance which probably has the formula

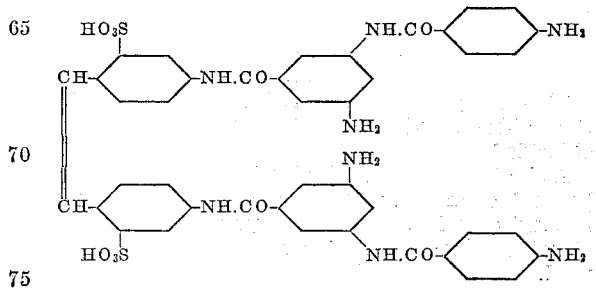

By condensing the para-nitroimide chloride under similar conditions with dehydro-thiotoluidine-disulfonic acid there is obtained a product of the probable formula

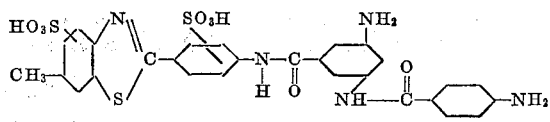

This product, as well as that of the first paragraph of this example, is characterized by an excellent affinity for vegetable fibres; it is adsorbed for instance by cotton from a neutral feebly alkaline bath. By diazotizing the goods so prepared and developing them with 1-phenyl-3-methyl-5-pyrazolone or with β-naphthol intense yellow or red dyeings are obtained.

The isomeric compounds obtained from the meta-nitroimide-chloride behave similarly.

Example 4

If in the first paragraph of Example 2, 42.9 parts of 1-(3'-amino)-phenyl-5-pyrazolone-3-carboxylic acid are substituted for the 51.9 parts of sulfanilic acid and the condensation and reduction are conducted in the same manner, there is produced an olive-green substance probably having the formula

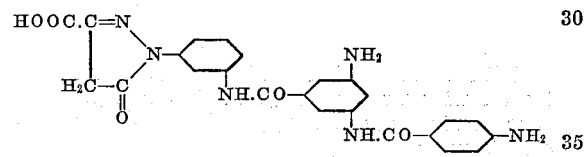

What we claim is:

1. Process for the manufacture of condensation products of the general formula

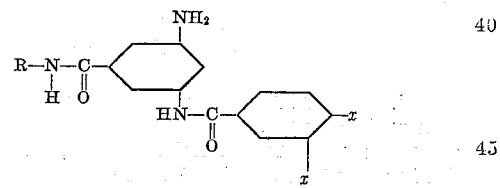

in which R stands for a radical which is itself characterized by the presence of an aromatic nucleus selected from the group consisting of aromatic nuclei of the benzene and naphthalene series and to which aromatic nucleus the formula

group is bound, one $x$ stands for a hydrogen atom and the other $x$ for an amino group, which comprises causing imide chlorides of the general formula

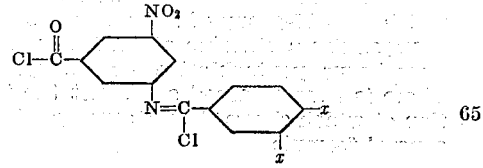

in which one $x$ stands for a nitro-group and the other $x$ stands for a hydrogen atom to react in the presence of water with compounds selected from the group consisting of aromatic compounds of the benzene and naphthalene series having at least one amino-group which is bound to an aromatic nucleus selected from the group consisting of aromatic nuclei of the benzene and naphthalene series, and then reducing the products thus obtained.

2. Process for the manufacture of condensation products of the general formula

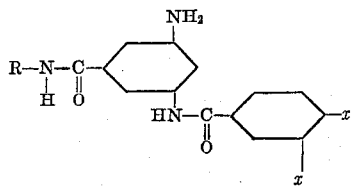

in which R stands for a radical which is itself characterized by the presence of an aromatic nucleus selected from the group consisting of aromatic nuclei of the benzene and naphthalene series and to which aromatic nucleus the formula

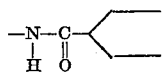

group is bound, one $x$ stands for a hydrogen atom and the other $x$ for an amino group, which comprises condensing imide chlorides of the general formula

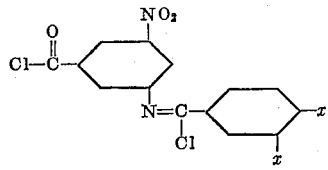

in which one $x$ stands for a nitro-group and the other $x$ stands for a hydrogen atom, with such compounds selected from the group consisting of aromatic compounds of the benzene and naphthalene series which on the one hand have at least one amino-group which is bound to an aromatic nucleus selected from the group consisting of aromatic nuclei of the benzene and naphthalene series and on the other hand at least one group selected from the group consisting of sulphonic acid and carboxylic groups, and then reducing the products thus obtained.

3. The products of the general formula

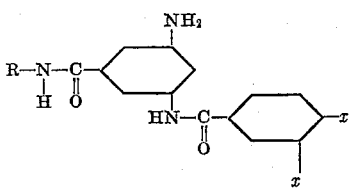

in which R stands for a radical containing an aromatic nucleus selected from the group consisting of aromatic nuclei of the benzene and naphthalene series, to which aromatic nucleus the formula

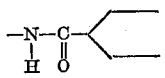

group is bound, one $x$ stands for a hydrogen atom and the other $x$ stands for an amino group.

4. The compounds of the general formula

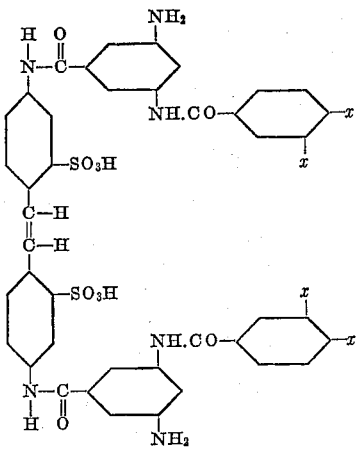

in which one $x$ stands for hydrogen and the other $x$ stands for an amino group.

5. The compounds of the general formula

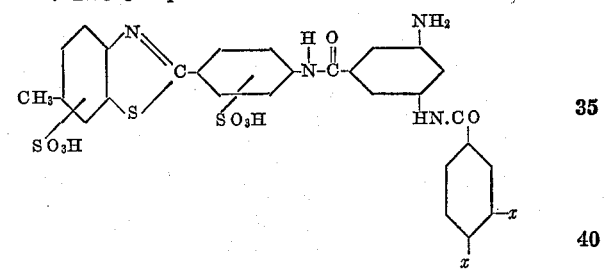

in which one $x$ stands for hydrogen and the other $x$ stands for an amino group.

6. The compounds of the general formula

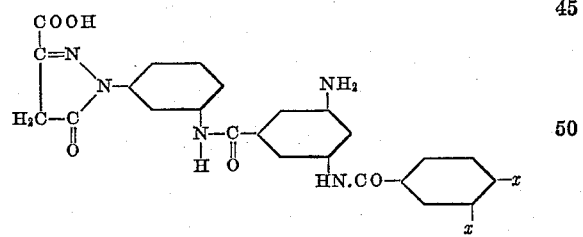

in which one $x$ stands for hydrogen and the other $x$ stands for an amino group.

EMIL EDUARD MISSLIN.
RUDOLF THOMANN.